United States Patent
Jung et al.

(10) Patent No.: US 10,894,462 B2
(45) Date of Patent: *Jan. 19, 2021

(54) SYSTEM AND METHOD FOR CONTROLLING COMPRESSOR OF COLD-START VEHICLE

(71) Applicants: Hyundai Motor Company, Seoul (KR); Kia Motors Corporation, Seoul (KR)

(72) Inventors: Tae Hun Jung, Seoul (KR); Jeong Sik Seo, Hwaseong-si (KR); Jaeyeon Moon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 239 days.

This patent is subject to a terminal disclaimer.

(21) Appl. No.: 16/174,717

(22) Filed: Oct. 30, 2018

(65) Prior Publication Data
US 2020/0031202 A1    Jan. 30, 2020

(30) Foreign Application Priority Data
Jul. 24, 2018    (KR) .................. 10-2018-0085892

(51) Int. Cl.
*F02D 43/04* (2006.01)
*B60H 1/32* (2006.01)
(Continued)

(52) U.S. Cl.
CPC ......... *B60H 1/3216* (2013.01); *B60H 1/3223* (2013.01); *B60W 10/06* (2013.01);
(Continued)

(58) Field of Classification Search
CPC .. B60H 1/3208; B60H 1/3216; B60H 1/3223; B60H 2001/3266; B60H 2001/3272;
(Continued)

(56) References Cited

U.S. PATENT DOCUMENTS

| | | | |
|---|---|---|---|
| 7,177,742 B2 * | 2/2007 | Makishima | B60H 1/322 62/133 |
| 2003/0196442 A1 * | 10/2003 | Wakisaka | F25B 49/022 62/133 |

(Continued)

FOREIGN PATENT DOCUMENTS

| KR | 10-1501781 B1 | 3/2015 |
|---|---|---|
| KR | 10-2015-0124487 A | 11/2015 |

*Primary Examiner* — Carl C Staubach
(74) *Attorney, Agent, or Firm* — Morgan, Lewis & Bockius LLP

(57) ABSTRACT

A system for controlling a compressor may include an engine controller that controls a fuel injection amount corresponding to an engine load and an opening amount of a throttle by reflecting a required torque required for an air conditioner (A/C), an operation information detector for detecting operation information according to driving state of the vehicle, a compressor that generates pressure during operation of the A/C, an air conditioner relay which is turned on when the air conditioner operates and is turned off when the A/C is stopped, and a controller which determines an engine negative pressure of an intake manifold, and when the cooling water temperature is lower than the predetermined temperature and the intake manifold pressure is lower than the first threshold value, a cold-start intake manifold negative pressure insufficient event is generated to reduce the A/C duty in accordance with the entry into a negative pressure recovery mode.

19 Claims, 6 Drawing Sheets

(51) Int. Cl.
*B60W 30/192* (2012.01)
*B60W 10/06* (2006.01)
*B60W 10/30* (2006.01)

(52) U.S. Cl.
CPC .......... *B60W 10/30* (2013.01); *B60W 30/192* (2013.01); *F02D 43/04* (2013.01); *B60H 2001/3273* (2013.01); *B60H 2001/3275* (2013.01); *B60W 2510/0671* (2013.01); *B60W 2520/10* (2013.01); *B60W 2530/00* (2013.01); *B60W 2540/10* (2013.01); *B60W 2540/12* (2013.01); *B60W 2552/15* (2020.02); *B60W 2555/20* (2020.02); *B60W 2710/0605* (2013.01); *B60W 2710/0616* (2013.01); *B60W 2710/305* (2013.01); *F02D 2200/021* (2013.01); *F02D 2200/0406* (2013.01); *F02D 2200/501* (2013.01); *F02D 2200/602* (2013.01); *F02D 2200/702* (2013.01); *F02D 2200/703* (2013.01); *F02D 2250/41* (2013.01)

(58) Field of Classification Search
CPC ... B60H 2001/3273; B60H 2001/3275; B60W 10/06; B60W 10/30; B60W 2510/0671; B60W 2520/10; B60W 2530/00; B60W 2540/10; B60W 2540/12; B60W 2552/15; B60W 2555/20; B60W 2710/0605; B60W 2710/0616; B60W 2710/305; B60W 30/192; F02D 2200/021; F02D 2200/0406; F02D 2200/0408; F02D 2200/501; F02D 2200/602; F02D 2200/702; F02D 2200/703; F02D 2250/24; F02D 2250/41; F02D 41/064; F02D 41/34; F02D 43/04

See application file for complete search history.

(56) References Cited

U.S. PATENT DOCUMENTS

2018/0043753 A1* 2/2018 Jung .................... B60H 1/3208
2019/0389279 A1* 12/2019 Jung .................... B60H 1/3216
2020/0180397 A1* 6/2020 Jung .................... B60T 17/221

* cited by examiner

SYSTEM AND METHOD FOR CONTROLLING COMPRESSOR OF COLD-START VEHICLE

CROSS-REFERENCE TO RELATED APPLICATION

The present application claims priority to Korean Patent Application No. 10-2018-0085892 filed on Jul. 24, 2018, the entire contents of which is incorporated herein for all purposes by this reference.

BACKGROUND OF THE INVENTION

Field of the Invention

The present invention relates to a system and method for controlling a compressor of a cold-start vehicle. More particularly, the present invention relates to a system and method for controlling a compressor of a cold-start vehicle which is applied to an air conditioner of a vehicle and variably controlled according to brake negative pressure conditions during cold-start.

Description of Related Art

Generally, when the brake negative pressure stored in the brake booster is insufficient, the brake pedal becomes hard and the risk of the accident becomes high. To solve the present problem, the logic that recovers the brake negative pressure by stopping the operation of auxiliary devices such as air conditioners such as air conditioner (A/C) is applied in the situation where the brake negative pressure is insufficient.

For example, a compressor applied to an air conditioner affects the engine load during operation due to the nature of the power of the engine, and when the brake negative pressure falls, there arises a problem in brake operation. Therefore, when the negative pressure of the brake drops to a certain value or less, the demand power is secured by stopping the air conditioner operation (A/C OFF, hereinafter referred to as "A/C CUT").

Here, the brake negative pressure means a value directly measured by mounting a sensor in the brake booster with the pressure stored in the actual brake booster. However, in many manufacturers, instead of mounting the sensor on the actual brake booster due to the problem of rising cost, the difference between the atmospheric pressure and the intake manifold pressure (hereinafter referred to as "the negative pressure of intake manifold") is used.

FIG. 1 is a conceptual diagram showing an A/C CUT logic using a conventional negative pressure of an intake manifold.

Referring to FIG. 1, the A/C CUT logic using the conventional negative pressure of the intake manifold is that if the negative pressure drops below a certain value regardless of the mounting, the highland (e.g., over 1500 m), and the flatland (lowland), and other vehicle driving conditions meet the criteria, A/C cut is generated.

However, the negative pressure of the intake manifold is not a measured value but a calculated value, and therefore, the difference between the atmospheric pressure and the negative pressure is calculated to be smaller than the actual brake booster and the A/C cut is generated despite the fact that enough negative pressure is stored in the actual brake booster. Particularly, in the cold-start section before the warm-up after the vehicle is turned on, the resistance of the engine and all auxiliary devices becomes large, so that the required torque is greatly increased and the negative pressure is liable to be insufficient, accordingly, the air conditioner ON/OFF (A/C ON/OFF) is repeated.

That is, the side effect causes frequent occurrence of A/C cut in the cold-start condition before the vehicle is warmed up, deteriorating the cooling performance, and it is impossible to dehumidify the vehicle, causing a customer complaint due to windshield moisture generation.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method for controlling a compressor of a cold-start vehicle in which A/C duty of the compressor is changed to a minimum operation in a situation where the engine negative pressure at the time of cold start of the vehicle is insufficient and the required torque is accordingly reduced, thereby preventing the air conditioner from being repeatedly turned on and off.

According to an exemplary embodiment of the present invention, a system for controlling a compressor of a cold-start vehicle may include an engine controller (ECU) that controls a fuel injection amount corresponding to an engine load and an opening amount of a throttle by reflecting a required torque required for an air conditioner (A/C), an operation information detector for detecting operation information according to the driving state of the vehicle, a compressor that generates pressure through a piston operation of a cylinder utilizing the power of the engine during operation of the air conditioner (A/C), an air conditioner relay which is turned on (ON) when the air conditioner operates and is turned off (OFF) when the air conditioner is stopped in a response to an operation signal of the ECU, and a controller which determines an engine negative pressure of an intake manifold stored in the brake booster at a value obtained by subtracting the engine pressure from the atmospheric pressure detected by the operation information, and when the cooling water temperature is lower than the predetermined temperature and the intake manifold pressure is lower than the first threshold value during operation of the air conditioner, a cold-start intake manifold negative pressure insufficient event is generated to reduce the A/C duty of the compressor in accordance with the entry into a negative pressure recovery mode.

Furthermore, the compressor may include a pressure regulator for regulating an operation rate of the piston by changing the angle of the swash plate in accordance with the A/C duty control signal applied from the controller.

Furthermore, the operation information detector may detect at least one operation information among the air conditioner operation state, vehicle speed, atmospheric pressure, inflation pressure, accelerator pedal operation state, brake operation state, sea level, road inclination, a timer, and coolant temperature.

Furthermore, the controller may determine as the cold-start intake manifold negative pressure insufficient event for a first predetermined time if all conditions that the condition of the accelerator pedal is not in operation, the condition of the coolant temperature is lower than a predetermined temperature, the vehicle speed is lower than the predetermined vehicle speed at which the vehicle is not completely stopped, and the intake manifold negative pressure is below the first threshold at which the intake manifold negative pressure is insufficient are all satisfied.

Furthermore, the controller may enter the negative pressure recovery mode and change the compressor to the minimum (min) A/C duty If a predetermined number of times that the air conditioner relay operation signal is turned off immediately after the air conditioner relay operation signal is turned on within the first set time set as the cold-start negative pressure insufficient event is repeated.

Furthermore, the controller may release the cold-start negative pressure insufficient event if the coolant temperature rises to a predetermined coolant temperature or higher within the first set time set by the cold-start negative pressure insufficient event.

Furthermore, the controller may release the A/C duty reduction control of the compressor when a second set time has elapsed after entering the negative pressure recovery mode.

Furthermore, the controller may restrict the entry into the negative pressure recovery mode when the vehicle is in a mounting state at a predetermined inclination or more or at a highland higher than a predetermined altitude.

Furthermore, the controller may perform the required torque control to determine the required torque reduction amount of the compressor simultaneously with the A/C duty reduction control of the compressor and send it to the ECU.

Furthermore, the ECU may reduce the fuel injection quantity to control the throttle to close upon receiving the required torque from the controller in accordance with the entry into the negative pressure recovery mode.

Meanwhile, a method for controlling a compressor of a cold-start vehicle according to an exemplary embodiment of the present invention may include a) controlling the compressor with a set basic A/C duty when the vehicle is turned on (ON) and the air conditioner (A/C) of the vehicle is operated, b) determining the negative pressure of the intake manifold stored in the brake booster at a value obtained by collecting the operation information and subtracting the intake manifold pressure from the atmospheric pressure, c) generating a cold-start intake manifold negative pressure insufficient event during the first set time if the coolant temperature is lower than a predetermined temperature and the negative pressure is lower than a first threshold value, and d) reducing the A/C duty of the compressor in accordance with the entry into the negative pressure recovery mode if the condition that the air conditioner relay operation signal is turned on and then turned off within the first set time is repeated a predetermined number of times.

Furthermore, in the step c), the cold-start intake manifold negative pressure insufficient event may be generated if the accelerator pedal is not operated (APS=OFF) on the basis of the operation information and the vehicle further satisfies the running condition at a low speed less than a predetermined vehicle speed at which the vehicle is not completely stopped.

Furthermore, the step c) may include generating a corresponding event holding signal for the first set time at the same time as the cold-start intake manifold negative pressure insufficient event and monitoring an operation signal of the air conditioner relay.

Furthermore, the step c) may include releasing the cold-start negative pressure insufficient event if the coolant temperature rises to a predetermined coolant temperature or higher within the first set time set by the cold-start negative pressure insufficient event.

Furthermore, the step d) may include generating a hold signal of the negative pressure recovery mode for a second set time to restrict the compressor from operating in the basic A/C duty.

Furthermore, the step d) may include performing negative pressure recovery control with a minimum (min) A/C duty at which the basic A/C duty is reduced in accordance with the entry into the negative pressure recovery mode.

Furthermore, the step d) may include performing the required torque control to determine the required torque reduction amount of the compressor simultaneously with the A/C duty reduction control of the compressor and send it to the ECU.

Furthermore, the step d) may include releasing the negative pressure recovery mode and returning to the basic A/C duty control when the second set time set in the negative pressure recovery mode has elapsed.

Furthermore, the step c) may include restricting the entry into the negative pressure recovery mode when the vehicle is in a mounting state at a predetermined inclination or more or at a highland higher than a predetermined altitude.

According to an exemplary embodiment of the present invention, it is possible to reduce the frequency of A/C cut due to insufficient negative pressure of the intake manifold and secure the dehumidification performance accordingly by detecting the condition that the negative pressure of the intake manifold is insufficient, securing the negative pressure of the intake manifold through the pre-A/C duty reduction control and the reduction of the required torque.

Furthermore, there is an effect that the operation of the compressor is repeatedly restricted by restricting the operation of the maximum (max) A/C duty of the compressor in a situation where the intake manifold pressure of the vehicle at the time of cold-start of the vehicle is insufficient.

Furthermore, by omitting the brake booster sensor and using the difference between the atmospheric pressure and the pressure of the intake manifold, it is possible to reduce the cost increase and improve the customer satisfaction by improving the trade-off relationship between the dehumidification/cooling performance and the brake performance.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
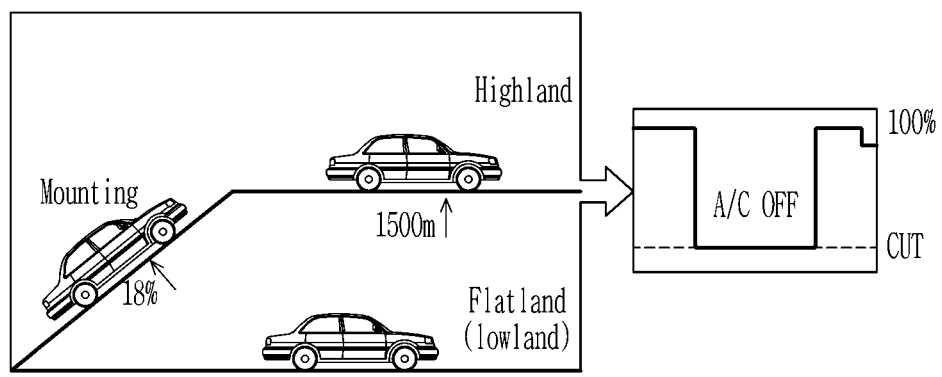
FIG. 1 is a conceptual diagram showing an A/C CUT logic using a conventional negative pressure of an intake manifold.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Furthermore, unless explicitly described to the contrary, the word "comprise" or variations such as "comprises" or "comprising" will be understood to imply the inclusion of stated elements but not the exclusion of any other elements. Furthermore, the terms "-er", "-or" and "module" described in the specification mean units for processing at least one function and operation and may be implemented by hardware components or software components and combinations thereof.

Furthermore, to effectively describe technical characteristics of the present invention, the following exemplary embodiment of the present invention may appropriately change, integrate, or separate terms to be clearly understood by a person of ordinary skill in the art, and the present invention is not limited thereto.

Throughout the specification, the negative pressure of the intake manifold refers to a determined value that estimates the negative brake negative pressure stored in the brake booster at a value obtained by subtracting the Intake Manifold pressure from the atmospheric pressure. Therefore, "negative pressure" in the exemplary embodiment of the present invention means "negative pressure of the intake manifold", not booster negative pressure, unless otherwise specified.

It may be noted that the system and method for controlling the compressor of the present invention described below are distinguished from those of the conventional technology in which the sensor for measuring the negative pressure of the brake is solved due to the characteristics of solving the problem of using the negative pressure of the intake manifold.

Now, a system and method for controlling a compressor of a cold-start vehicle according to an exemplary embodiment of the present invention will be described in detail with reference to the drawings.

Figure 2:
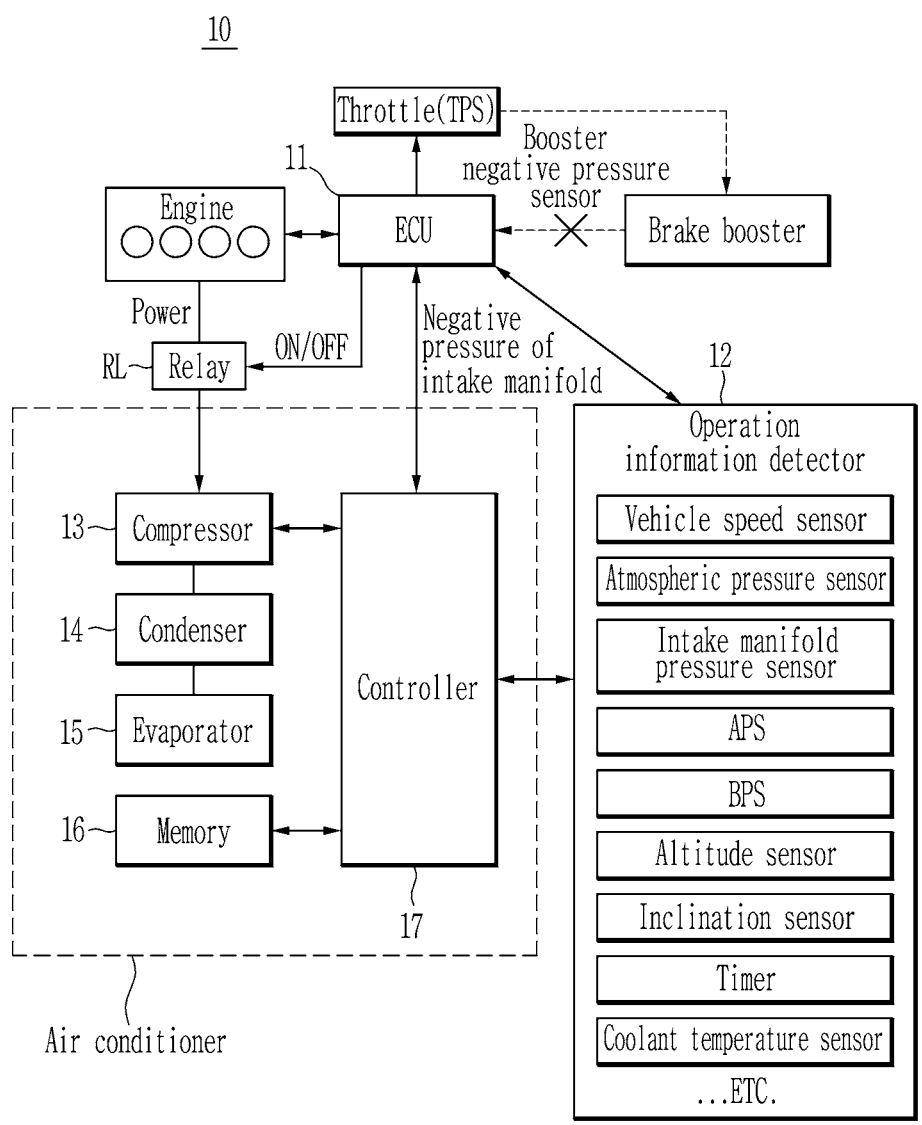
FIG. 2 schematically shows a system for controlling a compressor according to an exemplary embodiment of the present invention.

FIG. 2 schematically shows a system for controlling a compressor according to an exemplary embodiment of the present invention.

Figure 3:
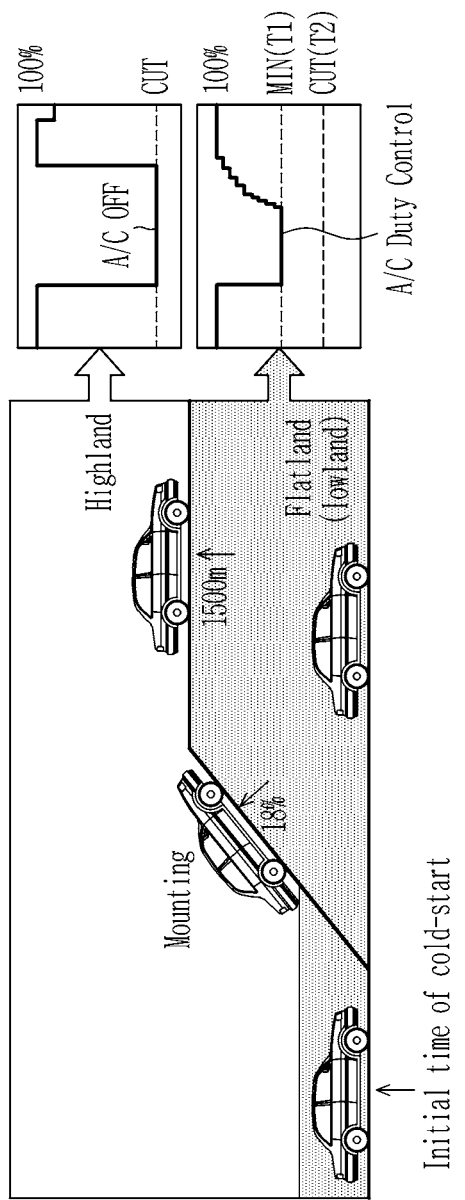
FIG. 3 is a conceptual diagram illustrating variable-compressor control logic according to an exemplary embodiment of the present invention.

FIG. 3 is a conceptual diagram illustrating variable-compressor control logic according to an exemplary embodiment of the present invention.

Referring to FIG. 2 and FIG. 3, a system 10 for controlling a compressor according to an exemplary embodiment of the present invention includes an engine control unit (ECU) 11, an air conditioner relay RL, an operation information detector 12, a compressor 13, a condenser 14, an evaporator 15, a memory 16 and a controller 17.

Before describing the present invention in full, the operation of the system for controlling the compressor 10 according to the exemplary embodiment of the present invention will be described with respect to the peripheral device on the characteristic of using the negative pressure which is not the brake negative pressure measured by the actual sensor.

Normally, the brake booster stores negative pressure to mechanically amplify the force the driver is stepping on the brake pedal and, when the brake pedal is actuated, transfers pressure to the brake for vehicle braking.

At the instant time, the source of the pressure used by the brake booster is the negative pressure of the intake manifold which is the difference between the atmospheric pressure and the intake manifold pressure. The negative pressure of the intake manifold is larger when the throttle (TPS) is closed due to the negative pressure and the throttle and smaller when the throttle is opened. Furthermore, when the driver depresses the accelerator pedal to open the throttle (TPS), the atmospheric pressure and the intake manifold pressure become equal to each other due to the inflow of air, so that the negative pressure of the intake manifold approaches zero. For the present reason, despite the fact that enough negative pressure is stored in the actual brake booster, the negative pressure of the intake manifold is determined to be small, which has the side effect of causing frequent A/C cuts.

In the cold-start condition before the coolant temperature reaches a certain temperature before the warm-up after the vehicle starts, the negative pressure of the intake manifold is maintained to be very low due to the conditions such as fast idle RPM and catalytic heating. In the present situation, since the negative pressure condition of the intake manifold during operation of the air conditioner (A/C) is already impossible to operate the compressor with normal duty (100% duty, max), due to the nature of the compressor operating logic, the A/C turns OFF almost simultaneously with the A/C ON, and the A/C turns ON again, and the A/C turns OFF immediately.

There is a situation in which the A/C operation cannot be performed for a few minutes due to such a situation. In such a situation, when it is the humid environment such as raining, there is a problem that the vehicle cannot be dehumidified.

Accordingly, the control system 10 for controlling the compressor according to the exemplary embodiment of the present invention changes the A/C duty to the minimum operation in a state where the negative pressure of the intake manifold at the time of cold-start of the vehicle is insufficient, reducing the required torque, to prevent the air conditioner (A/C) from being shut down due to the reduction of the engine load and to keep the operation state of the compressor at a minimum (min), improving the above-mentioned side effect.

The ECU 11 is a computing device that controls the overall operation for driving the engine, and controls the fuel injection amount according to the operation of auxiliary devices of the engine (compressor, alternator, etc.) so that the engine may be operated at a stable RPM.

The throttle opening amount TPS is controlled according to the fuel injection amount control of the ECU 11. As the fuel injection amount increases, the opening amount of the throttle (TPS) becomes larger and the fuel injection amount decreases, the opening amount of the throttle (TPS) becomes smaller.

When the opening amount of the throttle (TPS) is increased, the negative pressure of the intake pressure which is the difference between the atmospheric pressure and the intake manifold pressure becomes small. At the instant time, the ECU 11 receives a signal indicating that the negative pressure of the intake manifold is insufficient and moves the throttle in the closing direction thereof.

Conventionally, there are various methods of moving the throttle (TPS) in the closing direction. However, in general, a method of stopping the operation of the auxiliary device may be used. Typically, the A/C cut control is used to stop the compressor 13 for a few seconds with a small side effect due to a relatively instantaneous OFF. The A/C cut can reduce the engine load, moving the throttle (TPS) in the closing direction to promote the rise of the negative pressure.

The relay RL is configured to transmit the power of the engine to the compressor 13 in accordance with the required torque when the air conditioner A/C is operated. The relay RL is turned ON when the operation of the air conditioner A/C is ON and is turned off (OFF) when the operation of air conditioner A/C is stopped (A/C OFF).

That is, the ECU 11 controls the air conditioner relay RL to be OFF in the A/C cut control to reduce the required torque used in the compressor 13, controlling the throttle TPS in the closing direction, and recovers the negative pressure.

On the other hand, the ECU 11 controls the fuel injection amount by integrating not only the demanded torque of the driver according to the accelerator pedal operation (APS) but also the demanded torque received from auxiliary devices (for example, a compressor, an alternator or the like) of the engine.

The ECU 11 reflects the required torque required for the operation of the air conditioner (A/C) set as the default in accordance with the temperature setting (cooling condition) of the driver's air conditioner (A/C) to the total required torque, the opening amount of the throttle (TPS) is compensated.

In the following description according to the exemplary embodiment of the present invention, the ECU 11 controls the A/C duty reduction of the compressor 13 in accordance with the negative pressure recovery in the state where the negative pressure at the same time as the cold-start state of the controller 17 is insufficient, and receives the reduced torque demand thereby. At the instant time, the ECU 11 immediately decreases the fuel injection amount in accordance with the reception of the reduced required torque and supports interlocking control of the negative pressure recovery mode for controlling the throttle TPS in the closing direction to maintain the minimum (min) operating state without stopping the compressor 13.

The air conditioner (A/C) is an air conditioner of the vehicle. The air conditioner (A/C) variably controls the partial load of the compressor for preventing the brake negative pressure from dropping down to the A/C cut level in the ECU (11) which is a main constituent of variable torque control in the cold-start condition of the vehicle.

To the present end, the air conditioner (A/C) includes the compressor control logic in the cold-start condition of the vehicle for facilitating the variable control of the compressor to operate efficiently according to the driving information related to the vehicle and the environmental conditions.

The air conditioner (A/C) includes an operation information detector 12, a compressor 13, a condenser 14, an evaporator 15, a memory 16 and a controller 17. The air conditioner A/C is operated for cooling, ventilation and heating in the vehicle.

The air conditioner (A/C) improves the cooling performance as the operating ratio of the compressor 13 increases, and the operation ratio of the compressor 13 is determined according to the variable A/C duty control of the controller 17 according to the determination of the shortage of the negative pressure of the intake manifold based on the operation information.

The operation information detector 12 detects operation information measured by various sensors and various controllers according to the driving state of the vehicle. Here, the operation information may be data measured from the sensor and the controller, or information processed in a form necessary for the control of the compressor 13.

For example, the operation information detector 12 can provide values detected from a vehicle speed sensor, an atmospheric pressure sensor, an intake manifold pressure sensor, a speed change stage, an Accelerator Pedal Sensor (APS), a Brake Pedal Sensor (BPS), an altitude sensor, an inclination sensor, a timer, a coolant sensor etc. to the controller 17.

The compressor 13 compresses the refrigerant drawn in from the evaporator 15 during operation of the air conditioner (A/C) and delivers the compressed refrigerant to the condenser 14. The compressor 13 may be constituted by a variable capacity compressor for a vehicle which generates pressure through a piston operation of a cylinder utilizing the power of the engine transmitted through a belt. For example, the compressor 13 may include a pressure regulator configured for changing the angle of the swash plate (sprocket) according to the applied A/C duty control signal and adjusting the actuation rate of the piston (that is piston momentum).

The condenser 14 condenses and liquefies the refrigerant compressed by the compressor 13.

The evaporator 15 vaporizes the refrigerant liquefied by the condenser 14.

Besides, the description of the basic configuration of the air conditioner (A/C) is well-known to those skilled in the art, so unnecessary explanation is omitted.

The memory 16 stores a program and data for controlling the compressor 13, and stores data generated according to the operation.

The memory 16 stores a full automatic temperature control (FATC) based target duty control map MAP1 for control of the compressor 13.

Furthermore, the memory 16 can set and store A/C duty control map MAP2 for variable control of the compressor 13 and a required torque control map MAP3 corresponding to the A/C duty control map MAP2 in the situation of insufficient negative pressure of the intake manifold.

The controller 17 is an air conditioning controller for controlling the overall operation of the air conditioner (A/C), and enters the negative pressure recovery mode in accordance with the brake negative pressure insufficient event during the cold-start in conjunction with the ECU 11 to variably control the compressor 13.

The controller 17 detects the operation of the air conditioner (A/C ON/OFF), the vehicle speed, the atmospheric pressure, the intake manifold pressure, the accelerator pedal operation state (APS ON/OFF), the operation of the brake (BPS ON/OFF), the altitude, the road gradient, the timer, the coolant temperature and the like through the operation information detector 12.

The controller 17 controls the compressor 13 at a maximum (max) duty of 100% for an initial number of seconds according to normal FATC based basic A/C duty operation logic when the air conditioner is operated (A/C ON).

The controller 17 determines the negative pressure of the intake manifold stored in the brake booster at a value obtained by subtracting the pressure of the intake manifold from the atmospheric pressure detected by the operation information.

The controller 17 determines the cold-start negative pressure insufficient event based on the collected operation information when the air conditioner is operated (A/C ON).

The controller 17 can determine that it is a cold-start negative pressure insufficient event conditions that the coolant temperature is less than a predetermined temperature (e.g., 50° C.), the vehicle speed is less than the predetermined vehicle speed (e.g., 0.1 kh=vehicle speed=15 kph) at which the vehicle is not completely stopped, and the pressure is below the first threshold value T1 where the negative pressure is insufficient are all satisfied. At the instant time, the controller 17 generates a corresponding event holding signal (Low_bp=1) for a first set time (e.g., 100 seconds) and monitors an operation signal of the air conditioner relay RL at the same time as the event determination.

The controller 17 enters the negative pressure recovery mode and controls the compressor 13 to the minimum (min) A/C duty if the air conditioner relay (RL) signal is repeatedly turned on (ON) and stopped (OFF) a predetermined number of times (for example, twice) within the first set time. In the instant case, the minimum A/C duty control means to reduce the A/C duty to minimum (min) allowable value (duty limit) 50% at which the air conditioner (A/C) is not turned off when the maximum (max) A/C duty is 100%.

At the instant time, the controller 17 generates the negative pressure recovery mode maintaining signal (Low_bp_off=1) for the second set time (for example, 300 seconds) at the same time when the negative pressure recovery mode enters, and limits operation to maximum (max) compressor 13 A/C duty.

However, the controller 17 may unexpectedly release the cold-start negative pressure insufficient event when the coolant temperature rises above a predetermined water temperature (e.g., 50° C.) within the first set time set as the cold-start negative pressure insufficient event. It is determined that the coolant temperature has reached a certain temperature after the warm-up and the cold-start negative pressure insufficient event is released. Subsequently, the A/C duty control may be performed by entering the negative pressure recovery mode under the condition of the fluctuation of the negative pressure of the intake manifold.

Figure 4:
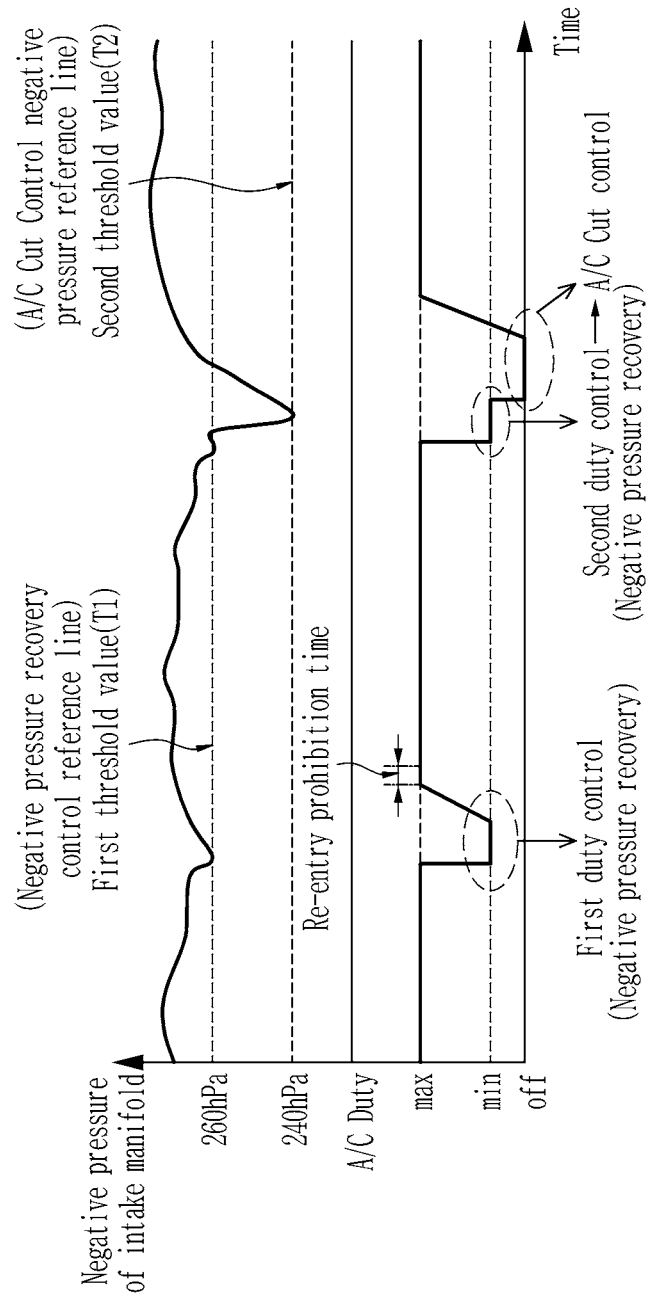
FIG. 4 shows an example of the negative pressure recovery mode entry condition and the A/C duty control according to an exemplary embodiment of the present invention.

For example, FIG. 4 illustrates a negative pressure recovery mode entry condition and an A/C duty control example according to an exemplary embodiment of the present invention.

Referring to FIG. 4, the controller 17 according to the exemplary embodiment of the present invention graphically displays the result of performing the A/C duty control by entering the negative pressure recovery mode according to the variation of the negative pressure of the intake manifold over time.

The controller 17 controls the compressor 13 to a general FATC target duty-based basic A/C duty.

When the negative pressure of the intake manifold falls below the first threshold value T1, the controller 17 enters the negative pressure recovery mode when the negative pressure may be recovered through the A/C duty control, and the A/C duty is reduced without the A/C cut, the negative pressure may be recovered (raised).

Here, the first threshold value T1 (for example, 260 hPa) means a value set as an A/C duty control start condition for preventing A/C cut with a negative pressure recovery control reference line indicating a state in which the negative pressure of the intake manifold is insufficient.

Furthermore, the second threshold value T2 (for example, 240 hPa) is the A/C cut control negative pressure reference line, and when the negative pressure of the intake manifold falls below the second threshold value, the A/C cut control is started.

That is, the first threshold value T1 (for example, 260 hPa) may be set to be a higher value than the second threshold to start the A/C duty control for predicting a negative pressure condition in which the negative pressure of the intake manifold decreases below a second threshold value T2 (for example, 240 hPa) which is an A/C cut control condition and preventing it.

The controller 17 controls the basic A/C duty to a maximum (max) value which is 100% when the negative pressure of the intake manifold is in excess of the first threshold T1 and the negative pressure is sufficient.

When the negative pressure of the intake manifold falls below the first threshold value T1, the controller 17 starts the negative pressure recovery control like the first duty control to change the A/C duty to the minimum (min) which is below 50%. At the instant time, the controller 17 applies the A/C duty control signal varying the maximum (max) A/C duty to the minimum (min) A/C duty to the compressor 13, and then the maximum (max) A/C duty is maintained for a predetermined holding time (e.g., 3 seconds) and then release the restriction.

Particularly, in the cold-start condition of the brake negative pressure insufficient event before the coolant temperature reaches a certain temperature before the warm-up after the vehicle starts, the controller 17 enters the negative pressure recovery mode and can change the A/C duty to the minimum (min) A/C duty since the engine negative pressure is maintained at a very low state falling below the second threshold value T2.

At the instant time, if the condition that the air conditioner relay (RL) signal becomes A/C off at the same time as A/C on and immediately becomes A/C off after A/C on is repeated, the controller 17 can determine the entry into the negative pressure recovery mode.

After the controller 17 performs the primary duty control and then returns to the basic A/C duty control, and the controller 17 prohibits (restricts) re-entry into the negative pressure recovery mode within a predetermined re-entry prohibition time (e.g., 0.2 sec). This is to prevent the phenomenon that the minimum (min) A/C duty is maintained continuously exceeding the holding time.

Furthermore, the controller 17 can generate the required torque control amount reduced correspondingly to the fluctuation in the minimum A/C duty and transfer it to the ECU 11 of the engine.

The required torque control amount means the required torque value of the air conditioner (A/C) which may be reduced when the A/C duty maximum output value (max) is reduced to the minimum (min) output for each of the inclination angle conditions.

For example, if the required torque is equal to 10 Nm/s when the inclination plate angle for the maximum (max) A/C duty output is 100%, the controller 17 subtracts the required torque control amount 5 Nm according to the A/C duty reduction control in which the inclination plate angle is reduced to 50% and can deliver the required torque reduced to 5 Nm to the ECU 11.

However, as shown in FIG. 3, the controller 17 can restrict the entry into the negative pressure recovery mode exceptionally when the vehicle is in a mounting condition requiring a high output of a predetermined gradient in consideration of the mounting conditions.

Furthermore, the controller 17 can restrict entry into the negative pressure recovery mode exceptionally if the vehicle is at a highland (for example, 1500 m) or more in consideration of the highland condition. This is because the number of times of support (performance) is reduced to almost half at the highland of about 1500 m or more, assuming that the negative pressure storage amount of the brake booster supports five times operation of the normal reference brake with reference to flatland.

Meanwhile, a method for controlling a compressor of a cold-start vehicle according to an exemplary embodiment of the present invention will be described with reference to FIG. 5 and FIG. 6 based on the configuration of the system for controlling the compressor 10 described above. However, the detailed configuration of the system for controlling the compressor 10 may be subdivided into individual functions or integrated into one system. Therefore, in describing the method for controlling the compressor of the cold-start vehicle through the figures, the subject will be referred to as the system for controlling the compressor 10.

Figure 5:
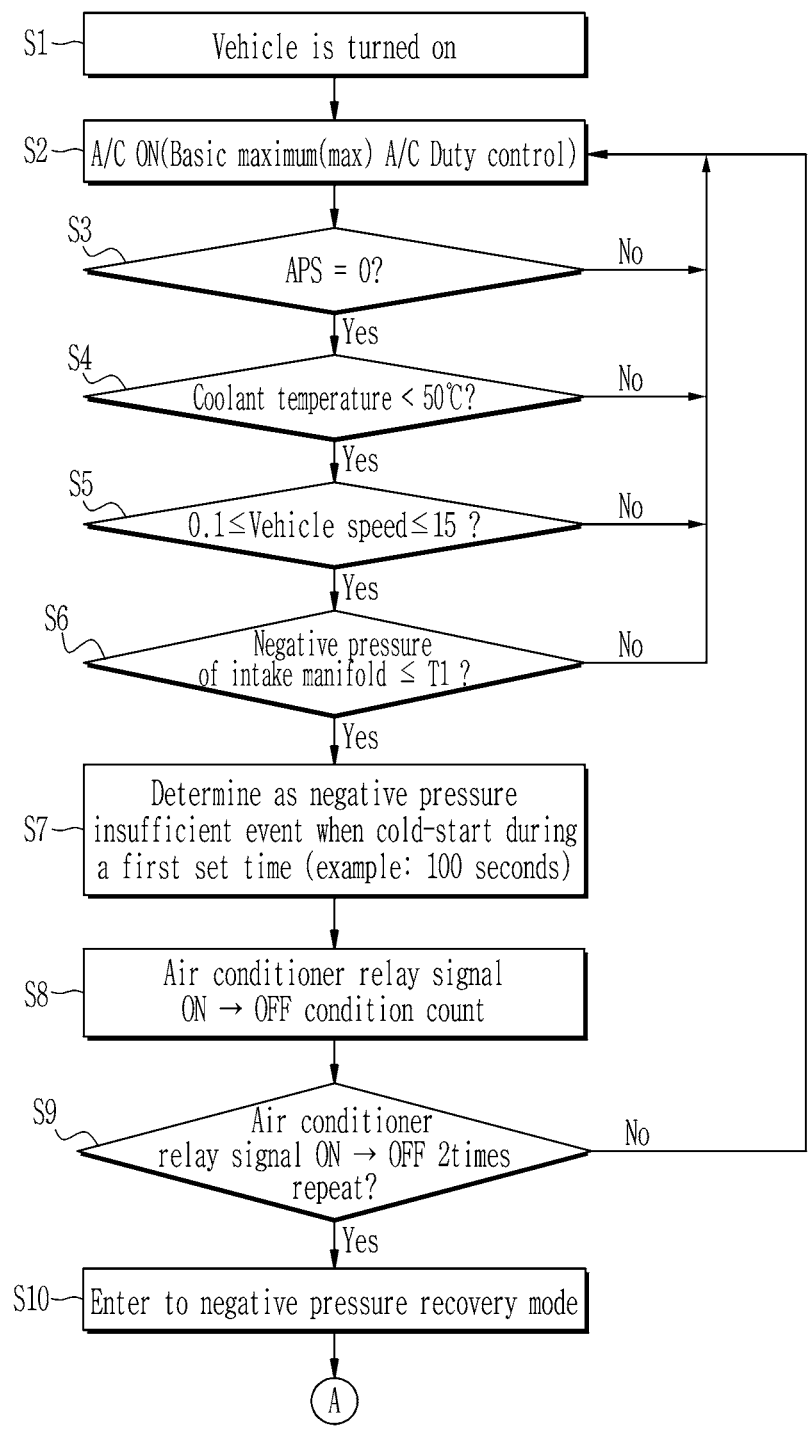
FIG. 5 and FIG. 6 are flowcharts schematically illustrating a method for controlling a compressor according to an exemplary embodiment of the present invention.
Figure 6:
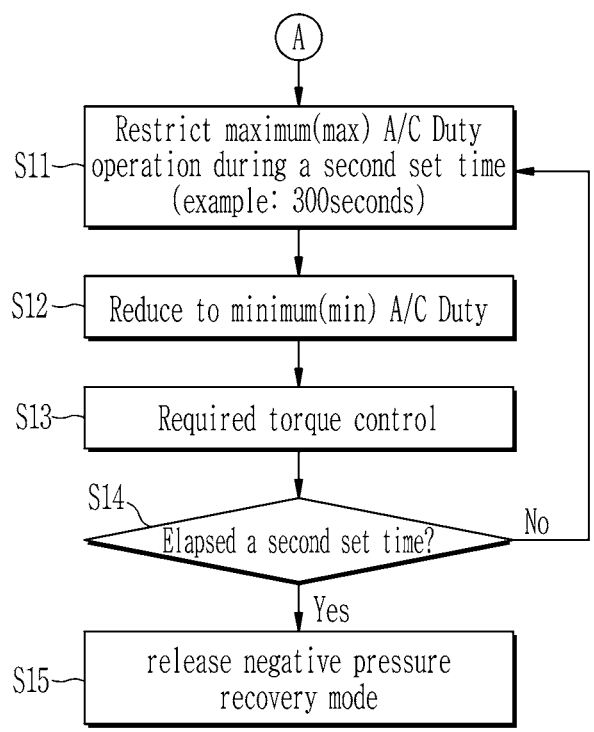

FIG. 5 and FIG. 6 are flowcharts schematically illustrating a method for controlling a compressor according to an exemplary embodiment of the present invention.

Referring to FIG. 5 and FIG. 6, in the system for controlling the compressor according to an exemplary embodiment of the present invention, when the vehicle is turned on (ON) S1 and the air conditioner (A/C) of the vehicle is operated, the compressor 13 is controlled with a set basic maximum (max) A/C duty on based on the FATC S2.

The system for controlling the compressor 10 collects driving information according to the running of the vehicle through the operation information detector 12 and monitors the entry condition to the negative pressure recovery mode based on the cold-start negative pressure insufficient event as shown in steps S3 to S6 below.

The system for controlling the compressor 10 determines as the cold-start intake manifold negative pressure insufficient event for a first predetermined time S7 if all conditions that the condition of the accelerator pedal is not in operation (APS=OFF) (S3; YES), the condition of the coolant temperature is lower than a predetermined temperature (e.g.; 50° C.) (S4; YES), the vehicle speed is lower than the predetermined vehicle speed (e.g.; 0.1 kh=vehicle speed=15 kph) (S5; YES) at which the vehicle is not completely stopped, and the intake manifold negative pressure is below the first threshold T1 (S6; YES) at which the intake manifold negative pressure is insufficient are all satisfied. On the other hand, if any one of the steps S3 to S6 is not satisfied (NO), it is determined as the cold-start negative pressure insufficient event.

The system for controlling the compressor 10 generates the corresponding event holding signal (Low_bp=1) for a first set time (for example, 100 seconds) at the same time as the event determination and monitors the operation signal of the air conditioner relay RL.

The system for controlling the compressor 10 counts a situation in which the air conditioner relay signal (RL) is turned on and then turned off within a first set time (S8), and if the count number is repeated several times (e.g., twice) (S9; YES), the negative pressure recovery mode is entered S10. On the other hand, if the count number is not repeated several times (e.g., two times) within the first set time (S9; NO), the system for controlling the compressor 10 releases the event and proceeds to step S2.

At the instant time, the controller 17 generates the negative pressure recovery mode maintaining signal (Low_bp_off=1) for the second set time (for example, 300 seconds) at the same time when the negative pressure recovery mode enters, and limits operation to maximum (max) compressor 13 A/C duty S11.

The system for controlling the compressor 10 performs the negative pressure recovery control for reducing the engine load by reducing the maximum A/C duty according to the entry into the negative pressure recovery mode to the minimum (min) A/C duty S12.

Meanwhile, when only the A/C duty is reduced by the negative pressure recovery control, the actual engine load is reduced, but the ECU 11 does not know to what degree the torque used in the compressor 13 is, so that the negative pressure recovery effect may be insignificant.

Therefore, the system for controlling the compressor 10 determines the required torque reduction amount of the compressor 13 according to the A/C duty reduction simultaneously with the A/C duty reduction control at the time of entering the negative pressure recovery mode and sends it to the ECU 11 The required torque control is performed S13. At the instant time, the system for controlling the compressor 10 may transfer the lowered required torque by subtracting the required torque control amount reduced by the minimum (min) A/C duty from the required torque output value according to the maximum (max) A/C duty to the ECU 11.

The system for controlling the compressor 10 counts the second set time, and if not elapsed (S14; NO), maintains the operating restriction to the maximum (max) A/C duty.

Thereafter, the system for controlling the compressor 10 releases the negative pressure recovery mode when the second set time has elapsed (S14; Yes) (S15). For example, the restriction is released to be able to operate up to 100% with the maximum (max) A/C duty in a situation where the negative pressure recovery mode is restricted to a minimum (min) A/C duty of less than 50%.

Like this, according to an exemplary embodiment of the present invention, it is possible to reduce the frequency of A/C cut due to insufficient negative pressure of the intake manifold and secure the dehumidification performance accordingly by detecting the condition that the negative pressure of the intake manifold is insufficient, securing the negative pressure of the intake manifold through the pre-A/C duty reduction control and the reduction of the required torque.

Furthermore, there is an effect that the operation of the compressor is repeatedly restricted by restricting the operation of the maximum (max) A/C duty of the compressor in a situation where the intake manifold pressure of the vehicle at the time of cold-start of the vehicle is insufficient.

Furthermore, by omitting the brake booster sensor and using the difference between the atmospheric pressure and the pressure of the intake manifold, it is possible to reduce the cost increase and improve the customer satisfaction by improving the trade-off relationship between the dehumidification/cooling performance and the brake performance.

The above-described exemplary embodiment of the present invention may not be realized by an apparatus and a method described above, but it may also be realized by a program that realizes functions corresponding to configurations of the exemplary embodiment or a recording medium that records the program. Such a realization may be easily performed by a person skilled in the art.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling a compressor of a cold-start vehicle, the system comprising:
    an engine control unit (ECU) that controls a fuel injection amount corresponding to an engine load and an opening amount of a throttle according to a required torque required for an air conditioner (A/C);
    an operation information detector for detecting operation information according to driving state of the cold-start vehicle;
    a compressor that generates pressure through operation of a piston in a cylinder utilizing power of an engine during operation of the air conditioner;
    an air conditioner relay which is turned on when the air conditioner operates and is turned off when the air conditioner is stopped in a response to an operation signal of the ECU; and
    a controller which is connected to the ECU and determines an intake manifold negative pressure stored in a brake booster by subtracting an intake manifold pressure from atmospheric pressure detected by the operation information detector, and when a cooling water temperature is lower than a predetermined temperature and the intake manifold negative pressure is lower than a first threshold value during operation of the air conditioner, a cold-start intake manifold negative pressure insufficient event is generated to reduce an A/C duty of the compressor in accordance with an entry into a negative pressure recovery mode.

2. The system for controlling the compressor of the cold-start vehicle of claim 1, wherein the compressor includes a pressure regulator for regulating an operation rate of the piston by changing an angle of a swash plate in accordance with an A/C duty control signal applied from the controller.

3. The system for controlling the compressor of the cold-start vehicle of claim 1, wherein the operation information detector detects at least one operation information among an air conditioner operation state, a vehicle speed, the atmospheric pressure, the intake manifold pressure, an accelerator pedal operation state, a brake operation state, an altitude, a road inclination, a timer, and a coolant temperature.

4. The system for controlling the compressor of the cold-start vehicle of claim 1, wherein the controller determines as the cold-start intake manifold negative pressure insufficient event for a first predetermined time when an accelerator pedal is not in operation, a coolant temperature is lower than a predetermined temperature, a vehicle speed is lower than a predetermined vehicle speed at which the cold-start vehicle is not completely stopped, and the intake manifold negative pressure is below the first threshold value at which the intake manifold negative pressure is insufficient.

5. The system for controlling the compressor of the cold-start vehicle of claim 4, wherein the controller enters the negative pressure recovery mode and changes the compressor to a minimum A/C duty when a predetermined number of times that an air conditioner relay operation signal is turned off after the air conditioner relay operation signal is turned on within a first set time set as the cold-start negative pressure insufficient event is repeated.

6. The system for controlling the compressor of the cold-start vehicle of claim 4, wherein the controller releases the cold-start negative pressure insufficient event when the coolant temperature rises to a predetermined coolant temperature or higher within a first set time set by the cold-start negative pressure insufficient event.

7. The system for controlling the compressor of the cold-start vehicle of claim 4, wherein the controller releases A/C duty reduction control of the compressor when a second set time has elapsed after entering the negative pressure recovery mode.

8. The system for controlling the compressor of the cold-start vehicle of claim 1, wherein the controller restricts the entry into the negative pressure recovery mode when the cold-start vehicle is in a mounting state at a predetermined inclination or more or at a highland higher than a predetermined altitude.

9. The system for controlling the compressor of the cold-start vehicle of claim 1, wherein the controller performs control of the required torque to determine a required torque reduction amount of the compressor with an A/C duty reduction control of the compressor and send the determined required torque reduction amount to the ECU.

10. The system for controlling the compressor of the cold-start vehicle of claim 9, wherein the ECU reduces a fuel injection quantity to control the throttle to close upon receiving the required torque from the controller in accordance with the entry into the negative pressure recovery mode.

11. A method for controlling a compressor of a cold-start vehicle, the method comprising:
    a) controlling, by a controller, the compressor with a set basic air conditioner (A/C) duty when the cold-start vehicle is turned on and an air conditioner of the cold-start vehicle is operated;

b) determining, by the controller, an intake manifold negative pressure stored in a brake booster by subtracting a detected intake manifold pressure from a detected atmospheric pressure;

c) generating, by the controller, a cold-start intake manifold negative pressure insufficient event during a first set time when a coolant temperature is lower than a predetermined temperature and the intake manifold negative pressure is lower than a first threshold value; and d) reducing, by the controller, the A/C duty of the compressor in accordance with an entry into a negative pressure recovery mode when a time in which an air conditioner relay operation signal is turned on and then turned off within the first set time is repeated a predetermined number of times.

12. The method for controlling the compressor of the cold-start vehicle of claim 11, wherein, in the step c), generating the cold-start intake manifold negative pressure insufficient event when an accelerator pedal is not operated on a basis of operation information and the cold-start vehicle further satisfies a running condition at a low speed lower than a predetermined vehicle speed at which the cold-start vehicle is not completely stopped.

13. The method for controlling the compressor of the cold-start vehicle of claim 11, wherein the step c) includes generating a corresponding event holding signal for the first set time at a same time as the cold-start intake manifold negative pressure insufficient event and monitoring an operation signal of an air conditioner relay.

14. The method for controlling the compressor of the cold-start vehicle of claim 11, wherein the step c) includes releasing the cold-start negative pressure insufficient event when the coolant temperature rises to a predetermined coolant temperature or higher within the first set time set by the cold-start negative pressure insufficient event.

15. The method for controlling the compressor of the cold-start vehicle of claim 11, wherein the step d) includes generating a hold signal of the negative pressure recovery mode for a second set time to restrict the compressor from operating in the basic A/C duty.

16. The method for controlling the compressor of the cold-start vehicle of claim 15, wherein the step d) includes performing negative pressure recovery control with a minimum A/C duty at which the basic A/C duty is reduced in accordance with the entry into the negative pressure recovery mode.

17. The method for controlling the compressor of the cold-start vehicle of claim 11, wherein the step d) includes performing control of a required torque to determine a required torque reduction amount of the compressor with an A/C duty reduction control of the compressor and send the determined required torque reduction amount to an engine control unit (ECU) connected to the controller.

18. The method for controlling the compressor of the cold-start vehicle of claim 15, wherein the step d) includes releasing the negative pressure recovery mode and returning to a basic A/C duty control when the second set time set in the negative pressure recovery mode has elapsed.

19. The method for controlling the compressor of the cold-start vehicle of claim 18, wherein the step c) includes restricting the entry into the negative pressure recovery mode when the cold-start vehicle is in a mounting state at a predetermined inclination or more or at a highland higher than a predetermined altitude.

\* \* \* \* \*